United States Patent

Johnson, Jr.

[15] 3,643,897
[45] Feb. 22, 1972

[54] NUTATION CORRECTION SYSTEM FOR SPIN-STABILIZED SATELLITE

[72] Inventor: George B. Johnson, Jr., Santa Clara, Calif.
[73] Assignee: Communications Satellite Corporation, Washington, D.C.
[22] Filed: Oct. 18, 1968
[21] Appl. No.: 768,631

[52] U.S. Cl. ................................ 244/1, 244/3.22, 244/77
[51] Int. Cl. ............................................................ B64g 1/00
[58] Field of Search ............... 244/1 SS, 3.22, 77 SS; 74/5.6; 343/705; 73/504

[56] References Cited

UNITED STATES PATENTS

| | | | |
|---|---|---|---|
| 3,189,299 | 6/1965 | Garner et al. | 244/1 SS |
| 3,362,229 | 1/1968 | Trueblood | 244/1 SS X |
| 3,365,147 | 1/1968 | Wolfe | 244/1 SS |
| 3,384,323 | 5/1968 | Gilbert et al. | 244/1 SS |
| 3,414,214 | 12/1968 | Robinson et al. | 244/1 SS |

*Primary Examiner*—Milton Buchler
*Assistant Examiner*—Jeffrey L. Forman
*Attorney*—Sughrue, Rothwell, Mion, Zinn & Macpeak

[57] ABSTRACT

A nutation control system for spin-stabilized satellites in which correction thrusters are cyclically fired by timed pulses generated in response to accelerometer signals. Correction is initiated when the accelerometer output exceeds a high-threshold level and continues until it is reduced below a low-threshold level. The termination point is detected by sampling the slope of the accelerometer signal during a window period in each half-cycle.

5 Claims, 8 Drawing Figures

INVENTOR
GEORGE B. JOHNSON, JR.

NUTATION CORRECTION SYSTEM FOR SPIN-STABILIZED SATELLITE

BACKGROUND OF THE INVENTION

This invention relates in general to a nutation control system for spin-stabilized satellites, and, more particularly, to a novel electronic control system for generating timed thruster-firing signals in response to accelerometer-sensing signals to reduce excessive nutational coning motion.

Guided missiles and satellites are commonly stabilized by spinning them around their longitudinal axes in the manner of a gyroscope. Any lateral perturbations, such as those produced by the roll or yaw tipoff torques that occur at booster separation, become nutational coning motions when the satellites are subsequently "spun up" by small rockets. This nutational motion is much the same as that undergone by a child's top as it slows down near the end of its spin. The nutation has a frequency generally corresponding to the spin rate and a naturally increasing amplitude or divergence due to unavoidable imbalances in the moments of inertia of the satellite contents. This undesired motion adversely affects satellite attitude control and ground communications if the satellite antennas are directional in nature, and can even result in eventual tumbling if allowed to continue unchecked.

Most of the prior art nutation control systems are purely mechanical and generally involve the release of tethered inertia weights to damp the motion, as exemplified in U.S. Pat. No. 3,277,486. These systems are unduly heavy and space consuming, which are serious drawbacks in space satellites, and are capable of effecting only an approximate degree of control at best.

SUMMARY OF THE INVENTION

The nutation control system of this invention provides a pair of accelerometers radially positioned from the satellite axis for sensing the nutational motion. The accelerometers are preferably diametrically opposed and located at a maximum radial distance from the satellite axis for optimal functioning. Each accelerometer output is fed to a control logic section where it is applied to a high threshold detector and to plus and minus low threshold detectors. The logic section generates cyclical firing pulses for a pair of diametrically opposed thrusters. The firing pulses have decreasing widths as the nutation angle is reduced. The firing pulses are initiated when the accelerometer signal reaches the high threshold level, and continue until the signal drops to within the low threshold levels.

BRIEF DESCRIPTION OF THE DRAWINGS

The foregoing and other objects, features and advantages of the invention will be apparent from the following more particular description of a preferred embodiment of the invention, as illustrated in the accompanying drawings in which:

FIGS. 3a and 3b show time plots of an accelerometer signal and the thruster pulses with the threshold levels drawn in.

DESCRIPTION OF THE PREFERRED EMBODIMENT

Figure 1:
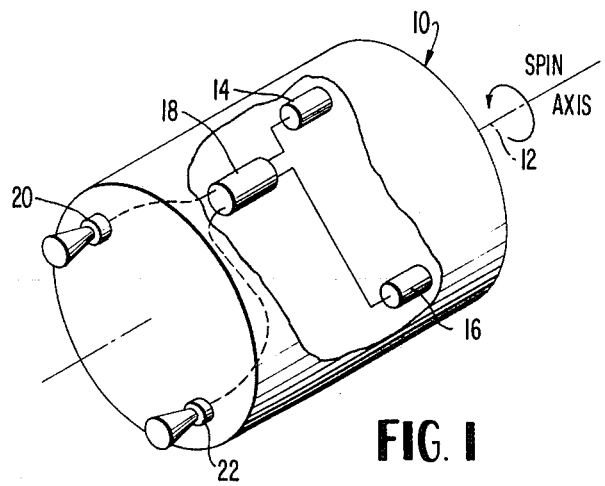
FIG. 1 shows a partial cutaway view of a spin-stabilized satellite illustrating the accelerometers, control logic and thrusters.

FIG. 1 shows a space satellite 10 spin-stabilized about a central longitudinal axis 12. A pair of diametrically opposed accelerometers 14 and 16 are mounted within the satellite near its outer surface, as seen through the cutaway portion. The accelerometers may be of any suitable type known in the art such as inertia weight-piezoelectric crystal devices, and are oriented to sense linear sinusoidal accelerations parallel to, and at a maximum radial distance from, the spin axis 12. The accelerometer output signals are coupled to a control logic section 18 which develops timed firing pulses, and these are in turn individually connected to a pair of reaction devices 20 and 22. The reaction devices may take any conventional form, such as hydrazine thrusters, compressed-gas jets, etc., and, like the accelerometers, are diametrically opposed and at a maximum radial distance from the spin axis for maximum effectiveness.

It should be noted at this point that a single accelerometer and thruster would be sufficient to implement nutation control. These components are employed in pairs in the illustrated embodiments to provide a backup capability in the event of the failure of one of the accelerometers and/or thrusters.

Figure 2:
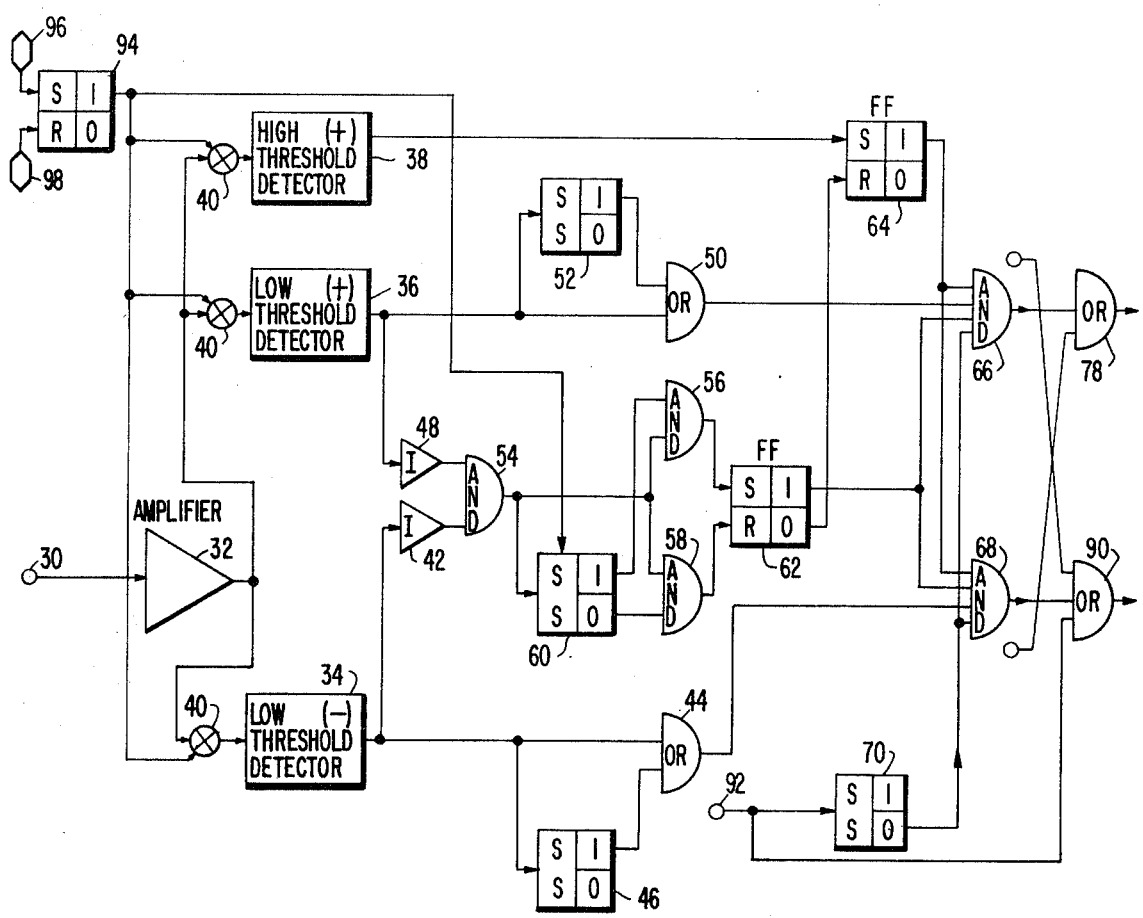
FIG. 2 shows a block diagram of the control logic section.

Referring now to FIG. 2, the output from one of the accelerometers 14 or 16 is applied through terminal 30 to the input of amplifier 32. Only one of the accelerometer inputs and its associated control logic section is shown in FIG. 2 in the interest of simplicity. The other accelerometer signal is fed to an identical control logic section whose outputs are crisscrossed with the FIG. 2 outputs, as developed below, to provide the aforementioned redundant capability in the event of a component failure. The crisscrossing of the logic section outputs results in both logic sections generating a firing pulse for the same thruster at the same time, and is necessitated by the fact that at a given point in a nutation cycle, one accelerometer will generate a maximum positive signal while the other accelerometer will generate a maximum negative signal.

The output from amplifier 32 is fed to a low minus threshold detector 34, a low plus threshold detector 36 and a high plus threshold detector 38 via scale factor multipliers 40, whose functions will be described later. The low minus threshold output is coupled to an inverter 42, an OR-gate 44 and the triggering input of a monostable multivibrator or single shot 46. Similarly, the low plus threshold output is coupled to an inverter 48, an OR-gate 50 and the triggering input of a single shot 52. The inverters 42 and 48 feed an AND-gate 54 whose output conditions AND-gates 56 and 58 and triggers single shot 60. The "one" output of single shot 60 triggers AND-gate 56 whose output then sets a flip-flop 62, while the "zero" output of single shot 60 triggers AND-gate 58 whose output resets flip-flop 62. The high threshold output sets a flip-flop 64 whose "one" output initially triggers output AND-gates 66 and 68. Flip-flop 64 is reset by the "zero" output from flip-flop 62. The other inputs to AND-gates 66 and 68 are supplied by OR-gates 44 and 50, the "one" output of flip-flop 62 and the "zero" output of a single shot 70, whose function will be explained later.

The operation of the control logic section will now be explained with occasional reference to the waveform diagrams of FIGS. 3 and 4. As nutational coning motion develops in the satellite 10 and the coning angle or divergence increases, the accelerometers 14 and 16 produce sinusoidal output signals proportional to the magnitude of the nutation. No correction forces will be applied by the thrusters 20 and 22 until the accelerometer outputs exceed the high threshold level since only then will flip-flop 64 be set, and the output from the latter supplies one of the four inputs to the output AND-gates 66 and 68.

Figure 4A:
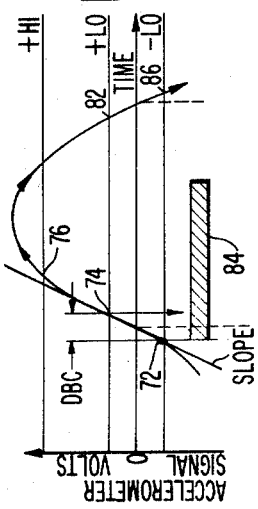
FIGS. 4a–4d show a sequence of decreasing accelerometer signal half-cycles and illustrate the slope detection function of the control logic section.
Figure 4B:
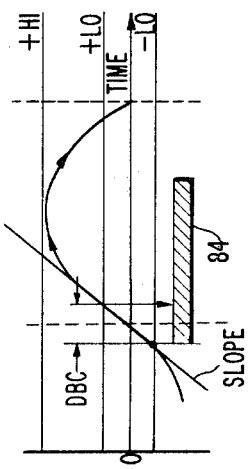
Figure 4C:
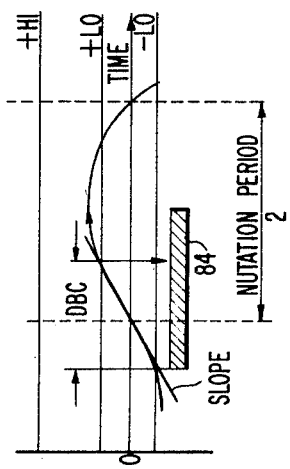

Just prior to the accelerometer signal exceeding the high threshold level, it will have crossed the low minus threshold level at point 72 in FIG. 4a on its way up and entered the deadband zone between the low minus and low plus thresholds. When the signal enters this deadband region the outputs from all three threshold detectors 34, 36, and 38 are down, and thus the outputs from inverters 42 and 48 and AND-gate 54 are up. This, in turn, conditions AND-gates 56 and 58 and fires single shot 60, whose "one" output then triggers AND-gate 56. The output from the latter sets flip-flop 62 whose "one" output supplies one of the four inputs to AND-gates 66 and 68. One of the other four inputs to AND-gates 66 and 68 is supplied by the raised "zero" output from single shot 70, and this input is always present unless a ground command signal for purposes of attitude control is transmitted to the satellite, as discussed later on.

Figure 3A:
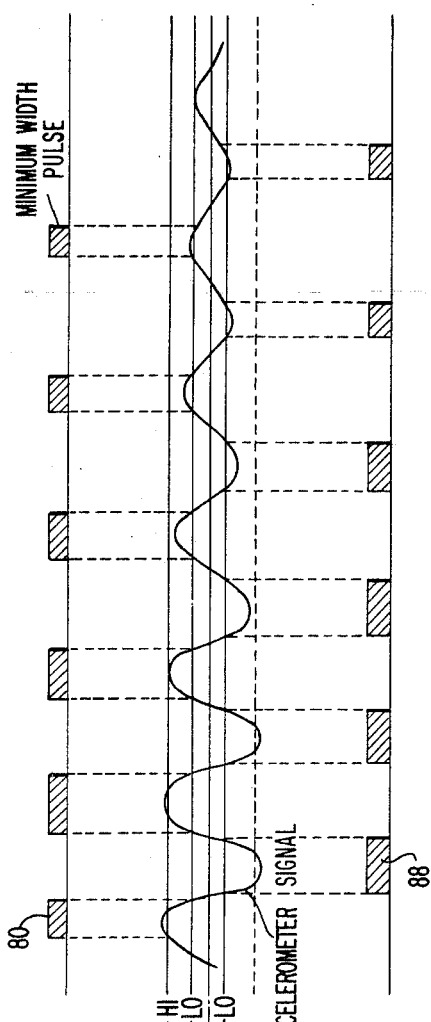
Figure 3B:
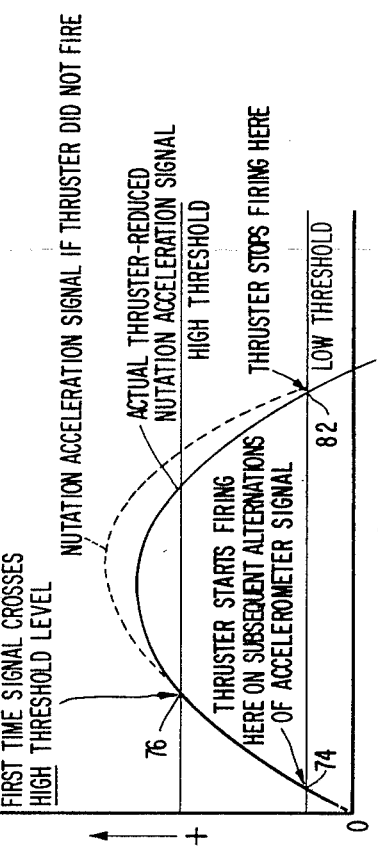

When the accelerometer signal crosses the low plus threshold at point 74 in FIGS. 3b and 4a, the output from the low plus threshold detector 36 is raised which supplies a third input for AND-gate 66 through OR-gate 50. The output from detector 36 also fires single shot 52 whose "one" output maintains the output of OR-gate 50 for a short time to ensure a minimum width thruster firing pulse, as developed below.

As the accelerometer signal reaches the high threshold level at point 76 in FIGS. 3b and 4a, the high threshold detector 38 raises its output which sets flip-flop 64. This supplies the fourth and final input to AND-gate 66 whose raised output now passes through OR-gate 78 to fire one of the thrusters. This first thruster pulse, shown at 80 in FIG. 3a, terminates when the accelerometer signal drops below the low plus threshold level at point 82 in FIGS. 3b and 4a to drop the output from detector 36 and OR-gate 50, single shot 52 having previously timed out.

Shortly before the termination of the first thruster firing pulse, single shot 60 timed out, as represented by the strip 84 in FIGS. 4a–4d, but this had no immediate effect since the output from AND-gate 54 was down at this point owing to the raised output from the low plus threshold detector 36. At point 82 the output from detector 36 drops again which raises the output from AND-gate 54 to once more condition AND-gates 56 and 58, fire single shot 60 and raise the output from AND-gate 56. This, too, has no effect, however, since flip-flop 62 is still set from the previous deadband crossing.

Shortly after the accelerometer signal enters its negative half-cycle, it crosses the low minus threshold level at point 86 in FIG. 4a which raises the output from the low minus threshold detector 34. This, in turn, raises the output of AND-gate 68 through OR-gate 44 to initate the firing pulse 88 in FIG. 3a to the other thruster through OR-gate 90. Firing pulse 88 is terminated when the accelerometer signal once more crosses the low minus threshold level near the end of its negative half-cycle.

This cyclical sequence continues to repeat itself, as shown in FIG. 3a, alternately generating firing pulses for thrusters 20 and 22. The thrusters are fired during appropriate sectors of their revolution around the spin axis to generate torques which tend to reduce the nutations. As the nutations are reduced, the amplitudes of the accelerometer signals decrease which shortens the time that each half-cycle of the signals is outside of the deadband region. This results in thruster firing pulses of decreasing widths or durations, as seen in FIG. 3a, which prevents an overshoot of the correction torques. The decrease of the accelerometer signal below the high threshold level as the correction torques are applied has no immediate effect on the circuitry of FIG. 2 since flip-flop 64 remains in its set or "one" state and continues to condition the output AND-gates 66 and 68.

Figure 4D:
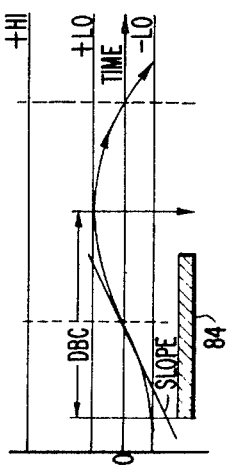

As the magnitude, and with it the slope, of the accelerometer signal decreases the deadband crossing time, represented by DBC in FIG. 4a–4d, increases and approaches the time delay 84 provided by single shot 60. When the point is reached, as shown in FIG. 4d, where the deadband crossing time exceeds the time delay 84, single shot 60 times out while the output of AND-gate 54 is still raised. This actuates AND-gate 58 whose raised output resets flip-flop 62. The lowered "one" output from flip-flop 62 now deconditions AND-gates 66 and 68 to terminate the entire nutation correction cycle, while the raised "zero" output from flip-flop 62 resets flip-flop 64 to prepare the circuit for the next correction cycle.

The single shot 60 thus samples the slope of the accelerometer signal during each half-cycle by providing a window period during which the deadband zone must be crossed in order to generate thruster firing pulses. Even without the slope sampling function provided by single shot 60, the nutation correction would cease as soon as the accelerometer signal decreased to an amplitude that remained within the deadband zone, since the low plus and low minus threshold detectors 36 and 34 would then stop producing outputs to actuate AND-gates 66 and 68.

The slope-sampling function provides a more accurate and positive means of terminating the cycle, however, and the result is the same since the time delay 84 provided by single shot 60 is chosen to substantially coincide with the deadband crossing time of a signal bordering on the low threshold levels, as shown in FIG. 4d. In addition, the resetting of flip-flop 62 by the timing out of single shot 60 before the deadband is crossed provides a convenient means for resetting flip-flop 64 in preparation for the next correction cycle.

Just before the termination of the correction cycle the accelerometer signal decreases to a magnitude which exceeds the low threshold levels for only very brief periods during each half-cycle. It would be impractical to limit the thruster firing pulses to these extremely short durations since a certain amount of ignition delay is involved before each thruster produces a full correction force. Single shots 46 and 52 come into play during this period by maintaining the firing outputs from OR-gates 44 and 50 for at least a minimum time period to thus ensure efficient thruster action.

As stated above, the control logic section shown in FIG. 2 is duplicated for the other accelerometer to provide a backup capability in the event of failure. Since the outputs from the diametrically opposed accelerometers are 180° out of phase the logic section outputs are crisscrossed at OR-gates 78 and 90, as shown in FIG. 2, so that both accelerometers fire the same thruster at the same time.

The thruster fired by OR-gate 90 is also employed to implement attitude control of the satellite in response to ground station commands applied to terminal 92. Since thruster firing due to nutation control during this period would interfere with the attitude control, output AND-gates 66 and 68 are disabled by the firing of single shot 70 and the consequent lowering of its "zero" output. The disabling period provided by single shot 70 is in the order of several seconds to ensure the termination of the attitude control signal.

An additional flip-flop 94 is also provided to implement a scale factor change in the logic section in response to a ground command signal applied to the set input of the flip-flop by pulser 96. This becomes necessary when the satellite spin rate is reduced by the release of yo-yo despin weights, despin jets, etc. When the spin rate is reduced the nutation frequency also decreases proportionately which in turn reduces the accelerometer outputs for the same coning angle. The effect is compensated for by increasing the scale factor in multipliers 40 in response to the raised "one" output from flip-flop 94. The "one" output of flip-flop 94 is also applied to single shot 60 to increase the time delay provided by the latter in order to compensate for the decreased nutation frequency and hence increased accelerometer signal period. Flip-flop 94 may be reset by a signal applied by pulser 98 as part of an indexing or zeroing operation, before the system is "turned on."

The operational sequence of the system may be broadly summarized as follows:

a. triggering of the high threshold detector initiates cyclical firing of the thrusters with pulses of decreasing widths, b. the slope of the accelerometer signal is sampled each time it passes through the deadband zone, c. thruster firing is stopped when the slope of the accelerometer signal decreases below a value indirectly established by the delay time of single shot 60, and corresponding to nutations within the low threshold levels, and d. thruster firing resumes only when the accelerometer signal again builds up to the high threshold level.

The concept of initiating nutation correction at a high threshold level and terminating it at a low threshold level results in considerable fuel conservation as opposed to a system, as exemplified in U.S. Pat No. 3,189,299, employing a single threshold level for both initiation and termination, since in the latter the correction mechanism is almost continuously energized and hunts about the single threshold level.

A further advantage of the system of this invention is that it employs the same thrusters provided for attitude control, thus reducing the overall hardware requirements of the system.

It is to be understood that the preferred embodiment of the invention described above is presented by way of example only, and various changes in modifications may be made therein by those skilled in the art without departing from the spirit and scope of the invention, as defined solely in the appended claims. For example, the high plus threshold detector could be a high minus threshold detector without affecting the circuit operation.

What is claimed is:

1. In a nutation control system for spin-stabilized satellites including an accelerometer producing a sinusoidal output signal proportional to the magnitude of nutational motion, a thruster for developing a force in opposition to the nutational motion, and means for generating cyclical thruster firing pulses in response to the accelerometer signal, the improvement comprising;
   a. means for initiating the train of thruster-firing pulses when the accelerometer output exceeds a first threshold level, and
   b. means for terminating the train of thruster-firing pulses when the accelerometer output falls below a second threshold level lower than the first, wherein the terminating means comprises:
      i. means for sampling the slope of the accelerometer output during a predetermined portion of each cycle, and
      ii. means for terminating the thruster-firing pulses in response to the slope falling below a predetermined value.

2. A nutation control system as defined in claim 1 further comprising means for ensuring that each thruster firing pulse has a predetermined minimum width.

3. A nutation control system as defined in claim 1 further comprising means for adjusting the first and second threshold levels and the predetermined value of the slope in response to a ground command signal to compensate for a change in the satellite spin rate.

4. A nutation control system as defined in claim 1 further comprising means for inhibiting the thruster-firing pulses in response to ground command signals to permit the application of attitude correction pulses to the thruster.

5. A nutation control system as defined in claim 1 wherein there are two diametrically opposed accelerometers, two generating means and two diametrically opposed thrusters, and the outputs of the generating means are crisscrossed to provide a redundant capability in the event of a component failure.

* * * * *